United States Patent [19]

Kirk et al.

[11] Patent Number: 5,655,116

[45] Date of Patent: Aug. 5, 1997

[54] APPARATUS AND METHODS FOR RETRIEVING INFORMATION

[75] Inventors: Thomas Kirk, Warren; Alon Yitzchak Levy; Divesh Srivastava, both of New Providence, all of N.J.

[73] Assignee: Lucent Technologies Inc., Murray Hill, N.J.

[21] Appl. No.: 203,082

[22] Filed: Feb. 28, 1994

[51] Int. Cl.$^6$ .................................................. G06F 17/30
[52] U.S. Cl. ................................... 395/601; 395/561
[58] Field of Search ............................. 395/600, 161, 395/575, 100

[56] References Cited

U.S. PATENT DOCUMENTS

| | | | |
|---|---|---|---|
| 4,408,302 | 10/1983 | Fessel et al. | 364/900 |
| 4,769,772 | 9/1988 | Dwyer | 395/600 |
| 4,933,800 | 6/1990 | Borgendale et al. | 364/523 |
| 5,021,989 | 6/1991 | Fujisawa et al. | 364/900 |
| 5,117,349 | 5/1992 | Tirfing et al. | 395/600 |
| 5,175,814 | 12/1992 | Anick et al. | 395/161 |
| 5,212,787 | 5/1993 | Baker et al. | 395/600 |
| 5,226,111 | 7/1993 | Black et al. | 395/54 |
| 5,241,621 | 8/1993 | Smart | 395/51 |
| 5,263,126 | 11/1993 | Chang | 395/51 |
| 5,265,014 | 11/1993 | Haddock et al. | 364/419.08 |
| 5,315,703 | 5/1994 | Matehny et al. | 395/164 |
| 5,355,320 | 10/1994 | Erjavic et al. | 364/488 |
| 5,355,474 | 10/1994 | Thuriasngham et al. | 395/600 |
| 5,369,761 | 11/1994 | Conley et al. | 395/600 |
| 5,379,366 | 1/1995 | Noyes | 395/54 |
| 5,388,196 | 2/1995 | Pajak et al. | 395/153 |
| 5,408,655 | 4/1995 | Oren et al. | 395/600 |

OTHER PUBLICATIONS

Saxton et al.;"Design of an integrated information retrieval/database management system"; IEEE, vol. 2, Issue 2, Jun. 1990; pp. 210–219.

Weishar et al.;"An Intelligent heterogeneous autonomous database architecture for semantic heterogeneity support."; IEEE, 1991; pp. 152–155.

R.D. Semmel; "Quick: a system that uses conceptual design knowledge for query information."; IEEE, 1992; pp. 214–221.

T. Topaloglou, et al., "Query Optimization for KBMSs: Temporal, Syntactic and Semantic Transformations", IEEE, 1992, pp. 310–319.

*Primary Examiner*—Wayne Amsbury
*Assistant Examiner*—Cheryl R. Lewis
*Attorney, Agent, or Firm*—Gordon E. Nelson

[57] ABSTRACT

A query translator translates a query between a graphical user interface and a knowledge representation system. The knowledge representation system reformulates the query and generates an access plan to access data requested by the query. The access plan utilizes several different protocols to access the query information located in dissimilar databases distributed throughout a network. The knowledge representation system generates the access plan by first processing the query through a world view which defines the information in conceptual terms that a human being would understand and then processes the query through a system/network view which redefines the query into network and database access information so that the data requested by the query can be located. Placing the world view and the system network view in the knowledge representation system enables real-time intelligence to be used in the search process by providing a feedback loop between the searched databases and the knowledge representation system.

19 Claims, 1 Drawing Sheet

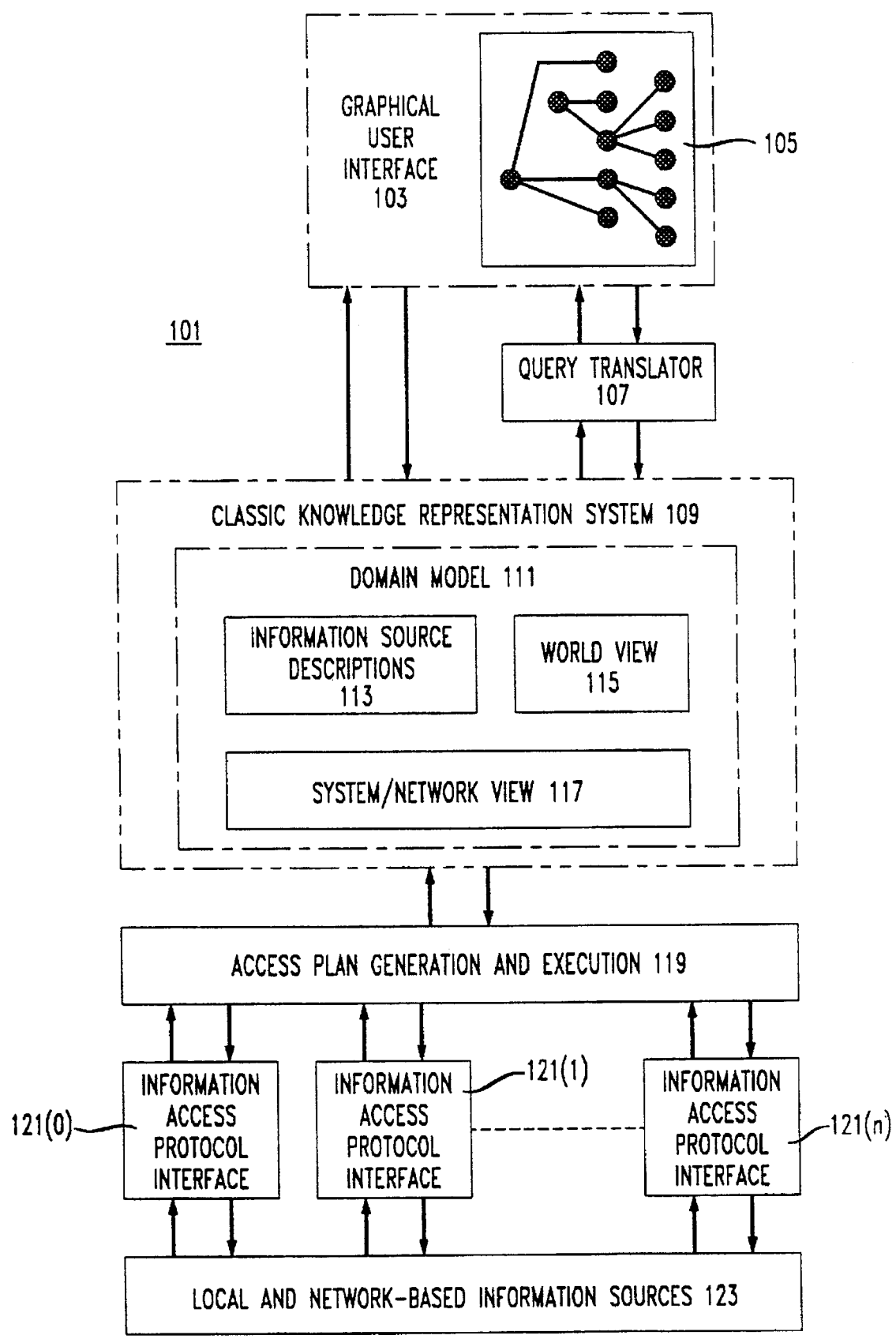

APPARATUS AND METHODS FOR RETRIEVING INFORMATION

BACKGROUND OF THE INVENTION

1. Field of the Invention

The invention concerns information retrieval generally. More specifically, the invention concerns the use of a knowledge base to integrate multiple sources of information into one uniform view.

2. Description of the Prior Art

People have been collecting information for a long time. Even the ancient world had its libraries and archives. In our day, we have astronomical amounts of information stored in libraries, archives, and data base systems around the world. In the relative recent past, we have begun to connect the data base systems to communications networks, so that a user at a workstation anywhere in the world can quickly access information in a data base system anywhere else in the world.

Ever since people began collecting information, they have had two problems with their collections:

Keeping track of the physical locations of items of information in the collection; and Imposing some kind of conceptual organization on the information.

In the context of a traditional library, the conceptual organization is provided by the cataloging system; for example, in the Dewey decimal cataloging system, each subject area has a number and all of the books about the subject area have that number. Keeping track of the physical locations is done by giving each number in the cataloging system a place on the shelves and putting the books having the number in that place. Maps and labels on the shelves tell users of the library where to look for a book. Finding a book thus involves going to the card catalogs, looking up the subject category in the catalog to find the catalog number, and then using the map to find the shelf where books having that catalog number are stored.

As the size of a collection of information increases, it becomes more and more difficult to get from a concept to the physical location of the information. For example, many very large traditional libraries do not permit ordinary users to go to the shelves and get a book. Instead, the user looks the book up in the card catalog and writes the title, author, and catalog number on a request slip. A specialist in finding books on the shelves then goes and gets the book for the user. A major disadvantage of such a system is that it does not permit the user to look up one book on a subject in the card catalog and then go to the shelf and browse to see what else is there.

While data base systems and networks have enormously increased the accessibility of information, they have made the problems of keeping track of the physical location and imposing a conceptual organization even more difficult. Keeping track of the physical location now involves not only knowing which of the enormous number of interconnected collections of information contains the information the user wants, but also knowing what sequences of commands (or protocols) are required to access the information over the network. Imposition of a conceptual organization has also become more difficult. Unlike human librarians, computers cannot deal directly with concepts. For example, a computer is helpless with a request like "tell me everything you know about Napoleon's youth", since it has no idea either that Napoleon is a historical person or what period of time could reasonably be termed his "youth". Before the computer can do anything, the request must be broken down so that the computer searches for the right Napoleon in a historical data base instead of a cooking data base and searches over the span of time which makes up the first 21 years of that Napoleon's life.

One technique which is now being used to impose an organization is to interpose a knowledge base system between the user and the data base systems which contain the information. In this technique, the conceptual organization of the information is provided by the knowledge base. Queries involving concepts are made to the knowledge base, which translates them into the commands needed to reference the data base system. See for example European Patent Application 0 542 430 A2, Alexander Borgida and Ronald Brachman, *Information Access Apparatus and Methods*, published May 19, 1993.

Attempts are also being made to build information retrieval systems which not only employ knowledge bases to impose a conceptual organization, but also to access information across a network. One example of such a system is that being built by the SIMS project, described in Yigal Arens and Craig A. Knoblock, "Planning and Reformulating Queries for Semantically-modeled Multidatabase Systems", in: *Proceedings of the First International Conference on Information and Knowledge Management*, Baltimore, Md., 1992. Problems left unsolved by these attempts include efficient location of the relevant information sources and the manner in which the system represents its knowledge about the location of the information. It is an object of the present invention to solve these and other problems and thereby to provide more efficient and usable information access methods and apparatus.

SUMMARY OF THE INVENTION

The invention integrates information about the location and access of the information into the information retrieval system by adding the information to the knowledge base which is used to provide the conceptual organization of the information. In the information retrieval system of the invention, the knowledge base not only includes a world view made up of the concepts which are employed in conceptual queries made to the system, but also a system view made up of concepts which indicate how the sources of the information are to be accessed. When the system responds to a user's conceptual query, it uses concepts in both the world view and the system view to produce an information access description. The information access description describes how the information is to be accessed in the information sources available locally or by means of the network. The information access description is interpreted in another component of the invention to produce the protocols required to retrieve the information needed to answer the query.

An important advantage of the fact that the system view is part of the knowledge base is that the knowledge base can be used to change how the protocols are generated in the course of the search. For example, results of one part of the search may be returned, and those results and the system view may be used to alter how the remainder of the search is carried out.

Other objects and advantages of the apparatus and methods disclosed herein will be apparent to those of ordinary skill in the art upon perusal of the following Drawing and Detailed Description, wherein:

BRIEF DESCRIPTION OF THE DRAWING

FIG. 1 is a conceptual overview of an information retrieval apparatus which employs the principles of the present invention.

Reference numbers in the Drawing have two parts: the two least-significant digits are the number of an item in a figure; the remaining digits are the number of the figure in which the item first appears. Thus, an item with the reference number 103 first appears in FIG. 1.

DETAILED DESCRIPTION OF A PREFERRED EMBODIMENT

The following Detailed Description begins with an overview of the architecture and continues with a detailed description of the Site Description Language used in a preferred embodiment.

ARCHITECTURE

Architecture Overview

FIG. 1 presents an overview of an information retrieval apparatus 101 which incorporates the principles of the invention. A preferred embodiment of information retrieval apparatus is implemented using a digital computer system and information sources which are accessible via the Internet communications network.

The central component of apparatus 101 is a knowledge base 109 built upon a description logic based knowledge representation system CLASSIC capable of performing inferences of classification, subsumption, and completion. Knowledge-base systems are described generally in Jeffery D. Ullman, *Principles of Database and Knowledge-base Systems*, Vols. I–II, Computer Science Press, Rockville, Md., 1989. Descriptions of CLASSIC may be found in Alex Borgida, Ronald Brachman, Deborah McGuinness, and Lori Resnick, "CLASSIC: A Structural Data Model for Objects", in *Proceedings of the* 1989 *ACM SIGMOD International Conference on Management of Data*, pp. 59–67, 1989, R. J. Brachman, et al., "Living with CLASSIC", in: J. Sowa, ed., *Principles of Semantic Networks: Explorations in the Representations of Knowledge*, Morgan-Kaufmann, 1991, pp. 401–456, and L. A. Resnick, et al., *CLASSIC: The CLASSIC User's Manual*, AT&T Bell Laboratories Technical Report, 1991.

Knowledge base 109 is used to construct a domain model 111 which organizes information accessible via apparatus 101 into a set of concepts which fit the manner in which the user of system 101 is intending to view and use the information. In system 101, domain model 111 has three components: world view 115, which contains concepts corresponding to the way in which a user of the system looks at the information being retrieved, system/network view 117, which contains concepts corresponding to the way in which the information is described in the context of the data bases which contain it and the communications protocols through which it is accessed, and information source descriptions 113, which contains concepts describing the information sources at a conceptual level. System/network view 117 and information source descriptions 113 are normally not visible to the user. The concepts in these portions of domain model 111 do, however, participate fully in the reasoning processes that determine how to satisfy a query.

An important benefit of using a description logic system like CLASSIC is that as new information is added to the system, much of the work of organizing the new information with respect to the concepts already in knowledge base 109 is done automatically. Only a description of the known attributes of the information must be specified; the CLASSIC's inference mechanisms then automatically classifies these descriptions into appropriate places in the concept hierarchy.

User interaction with the system is accomplished through browsing and querying operations in terms of high-level concepts (concepts that are meaningful to a user unsophisticated in the details for information location and access). These concepts are intended to reflect the terms in which the user thinks about the type and content of information being queried. By working with these high-level concepts, the user is unburdened with the details of the location and distribution of information across multiple remote information servers.

Information sources 123 are generally (though not limited to) network-based information servers that are accessed by standard internet communication protocols. Sources can also include databases, ordinary files and directories, and other knowledge bases.

User Interface

The user interacts with the system through a graphical user interface 103 . The two primary modes of interaction supported by this interface are querying and browsing. In both cases the user expresses both browsing and querying operations in terms of concepts from "world view" portion 115 of domain model 111.

A knowledge base browser in CLASSIC 109 allows the user to view and interactively explore the concept taxonomy. The concept taxonomy is represented graphically as a directed graph 105, where the nodes correspond to concepts and edges indicate parent/child relationships among concepts.

To support extension of the concept taxonomy, the knowledge base browser also serves as an editor, allowing the user to define new concepts in terms of existing ones. The classification inferences in knowledge representation system 109 automatically place new concepts at the correct place in the taxonomy with respect to existing concepts.

Since both the high-level world concepts 115 and low-level system concepts 117 coexist in a single domain model 111, an important role of user interface 103 is to filter the system concepts out of the view seen by the user in query results and in the taxonomy browser.

Query Translator 107

The query language used in system 101 is based on CLASSIC, but has additional constructors that enable the user to express queries more easily. The query is formulated in terms of the concepts and objects that appear in the world view part 115 of the knowledge base. Query translator 107 translates queries expressed in the query language into CLASSIC description language expressions which are used to consult the knowledge base. Due to the limited expressive power of the description language and the need for special purpose query operators, the query language may contain elements not expressible in the description language of knowledge representation system 109. After partial translation to a description language expression, the remaining fragments of the query are translated to procedural code that is executed as part of the query evaluation.

Knowledge Representation System 109

The knowledge base is a virtual information store in the sense that the information artifacts themselves remain external to the knowledge base; the system instead stores detailed information (in terms of domain model 111) about the location of these information artifacts and how to retrieve them. Retrieval of a particular piece of information is done on demand, when it is needed to satisfy part of a query. The types of information managed in this manner include files, directories, indexes, databases, etc.

The domain model embodied in the knowledge base is logically decomposed into world view 115, system/network view 117, and information source descriptions 113 World view 115 is the set of concepts with which the user interacts and queries are expressed. System/network view 117 concerns low level details which, though essential for generating successful query results, are normally of no interest to the user. Information source descriptions 113 is a collection of concepts for describing information sources. These information source descriptions are expressed in terms of both world and system concepts. The purpose of encoding information source descriptions 113 in the domain model is to make it possible for CLASSIC to reason about what information sources must be consulted in order to satisfy a query.

We define system concepts comprising system/network view 117 as those concepts that describe the low-level details of information access. This includes concepts related to network communication protocols, location addressing, storage formats, index types, network topology and connectivity, etc. Since the knowledge base generally merely retrieves information instead of storing previously-retrieved information, system/network view 117 includes all those concepts relevant to determining attributes like location, retrieval methods, and content format.

Continuing in more detail, concepts within world view 115 describe things with which the user is familiar; they are the concepts that describe characteristics of information artifacts of interest to users. Concepts within information source descriptions 113 relate the concepts in world view 115 to concepts concerning the semantic content of information sources. Thus, given a query which employs concepts in world view 115, knowledge representation system 109 can employ the concepts in information source descriptions 113 to relate the concepts used in the query to actual information sources and can employ system/network view 117 to relate the concepts used in the query to an access plan which describes how to retrieve information from the sources as required to answer the query.

Access Plan Generation and Execution

When a user wishes to obtain information, the user inputs a query in system 101's query language at graphical user interface 103. System 101 then answers the query. There are several steps involved. First, query translator 107 translates the query into a form to which knowledge representation system 109 can respond. Then the translated query .is analyzed in knowledge base system 109 to decide which of the external information sources are relevant to the query, and which subqueries need to be sent to each information source. This step uses world view 115 and system/network view 117. The information in system/network view 117 is expressed in a site description language which will be described in more detail later.

Knowledge base 109 uses The conceptual information from world view 115 and system/network view 117 to produce an information access description describing how to access the information required for the query in information sources 123. Knowledge base 109 provides the information access description to access plan generation and execution component 119, which formulates an access plan including the actual commands needed to retrieve the information from sources 123.

1. Plan formulation: Given the information access description, planner 119 decides on the order in which to access sources 123 and how the partial answers will be combined in order to answer the user's query. The key distinction between this step and traditional database techniques is that planner 119 can change the plan after partial answers are obtained. Replanning may of course involve inferences based on concepts from information source descriptions 113 and/or system/network view 117 and the results of the search thus far.

2. Plan materialization: The previous step produced a plan at the level of logical source accesses. This step takes these logical accesses and translates them to specific network commands. This phase has two aspects:

Format translation: the description of the sites is given at a logical level. However, to actually access the site, one must conform to a syntax of a specific query language. In this step, these translations are done.

Specific network commands are generated to access the sites. Here, information from the system/network view is taken into account. Depending on the site being accessed, the system will generate the appropriate commands for performing the access.

The translations to service and site-specific access commands are performed by Information Access Protocol Modules 121 (0 . . . n), described in the following section.

Several points should be noted about the above process:

In executing the plan, system 101 uses a work space in the computer system upon which system 101 is implemented to store its intermediate results.

After executing part of the plan, system 101 may decide to replan for the rest of the query.

Information Access Protocol Modules 121

Access to information sources is done using a variety of standard information access protocols. The purpose of these modules is to translate generic information access operations (retrieval, listing collections, searching indexes) into corresponding operations of the form expected by the information source. For many standard Internet access protocols, the translation is straightforward.

Examples of access protocols supported by these modules include several network protocols defined by Internet RFC draft standard documents, including FTP (File Transfer Protocol), Gopher, NNTP (Network News Transfer Protocol), HTTP (Hypertext Transfer Protocol). In addition, other modules support access to local (as opposed to network-based) information repositories, such as local filesystems and databases.

Site Description Language

As previously pointed out, the concepts in information source descriptions 113 relate concepts in world view 115 to information sources 123. These relationships are expressed using a site description language. CLASSIC and related knowledge representation systems employ description languages which can function as site description languages, but such site description languages do not permit efficient reasoning. In a preferred embodiment, efficiency has been substantially increased by the use of a site description language which extends CLASSIC.

The following discussion of the site description language employed in the preferred embodiment employs the example below:

Consider an application in which we can obtain information about airline flights from various travel agents. We have access to fares given by specific travel agents and to telephone directory information to obtain their phone numbers. In practice, the information about price quotes and telephone listings may be distributed across different external database servers which contain different portions of the information. For example, some travel agent may deal only with domestic travel, another may deal with certain airlines. Some travel brokers deal only with last minute reservations, e.g., flights originating in the next one week. Similarly, directory information may be distributed by area code. In some area codes, all listings may be in one database, while others may partition residential and business customers.

The starting point for the site description language is the description language used in CLASSIC. A description language consists of three types of entities: concepts (representing unary relations), roles (binary relations) and individuals (object constants). Concepts can be defined in terms of descriptions that specify the properties that individuals must satisfy to belong to the concept. Binary relationships between objects are referred to as roles and are used to construct complex descriptions for defining concepts. Description logics vary by the type of constructors available in the language used to construct descriptions. Description logics are very convenient for representing and reasoning in domains with rich hierarchical structure. Description languages other than the one uses in CLASSIC exist and may be used as starting points for site description languages. The only requirement is that the question of subsumption (i.e., does a description $D_1$ always contain a description $D_2$) be decidable. We denote the concepts in our representation language by $D=D_1, \ldots, D_l$.

In our example, we can have a hierarchy of concepts describing various types of telephone customers. The concept customer is a primitive concept that includes all customers and specifically the disjoint subconcepts Business and Residential. Each instance of a business customer has a role BusinessType, specifying the types of business it performs. Given these primitive concepts, we can define a concept TravelAgent by the description (AND Business (fills BusinessType "Travel")).

One limitation of description languages is that they do not naturally model general n-ary relations (A relation may be thought of as a a table with columns and rows. An n-ary relation has n columns.) n-ary relations arise very commonly in practice and dealing with such relations is essential to modeling external information sources that contain arbitrary relational databases. Hence our representation language augments description languages with a set of general n-ary relations $E=E_1, \ldots, E_n$. It should be emphasized that the general n-ary relations are not part of the description language. Hereafter, we refer to the set of relations $E \cup D$ as the knowledge base relations, to distinguish them from relations stored outside knowledge representation system 109. Our application domain is naturally conceptualized by the following two relations:

Quote(ag,al,src,dest,c,d), denotes that a travel agent ag quoted a price of c to travel from src to dest on airline al on date d.

Dir(cust,ac,telNo), gives the directory listing of customer cust as area code ac and phone number telNo.

A key aspect of our representation language is the ability to capture rich semantic structure using constraints, with which CLASSIC can reason efficiently. An atomic constraint is an atom either of the form $D(x)$, where D is some concept in D, and x is a variable, or $(x_i \theta x_j)$ (or $(x_i \theta a)$) where $x_i$ and $x_j$ are variables, $\alpha$ is a constant and $\theta \in \{>, \geq, <, \leq, =, \neq\}$.

Arbitrary constraints are formed from atomic constraints using logical operators $\wedge$ axed $\vee$. CLASSIC can determine efficiently whether one constraint entails another using subsumption reasoning in the description logic. Other well-known techniques are used for implication reasoning of order constraints. For details, see the Ullman reference cited above. Any atomic constraint may be used about which implication/subsumption reasoning can be done efficiently. Constraints play a major role in information gathering and are used in several ways. First, semantic knowledge about the general n-ary relations E can be expressed by constraints over the arguments of the relations. In our example, we can specify that the first argument of the relation Quote must be an instance of the concept TravelAgent. Second, as we discuss in subsequent sections, constraints can be used to specify subsets of information that exist at external sites. For example, a travel gent may have only flights whose cost is less than $1000. Finally, as we see below, constraints are extremely useful in specifying complex queries.

Constraints may be used together with concepts and knowledge base relations to describe properties of extensions of the knowledge base relations, that is, information specified by the knowledge base relations and the properties. The information in the extension may come from the knowledge base, but most often it will come from one or more of the information sources 123. We assume that the definitions of the concepts exist in the knowledge base, although the extensions of the concepts and the relations may not be entirely present in the knowledge base. However, we assume that constraints contain only concepts whose extensions exists in the knowledge base.

Given a query (defined formally below), the knowledge base system must infer the missing portions of the extensions of relations needed to answer the query, using the information present at the external sites. For the purpose of our discussion, the knowledge base can also be viewed as an information source containing part of the extensions.

The query language that we use in our discussion combines the use of concepts from description logics and Horn rules, as described in Francesco Donini, M. Lenzefini, D. Nardi, and A. Schaerf", "A Hybrid System Integrating Datalog and Concept Languages", in *Working notes of the AAAI Fall Symposium on Principles of Hybrid Reasoning*, 1991. A query is essentially a relation defined in terms of a set of Horn rules, using the relations E, intermediate relations I, and constraints. Each rule is of the form $$L_1(\overline{X}_1) \wedge \ldots \wedge L_n(\overline{x}_n) \rightarrow L(\overline{x}).$$

where each $L_i$ is either a constraint or an atom of a relation in $E \cup I$, and L is a relation in I. Note that the predicates in I (and therefore, the query predicate) may be recursively defined. For example, we might be interested in the following query that retrieves phone numbers of travel agents in New York City who sell tickets from NYC to Paris for under $500, on Air France:

Quote(name,AirFrance,NYC,Paris,c,d)$\wedge$Dir(name,ac, telNo)$\wedge$(c$\leq$$500)$\wedge$(ac=212)$\rightarrow$Answer(telNo).

The Site Description Language $SL_0$

We now describe the site description language in detail. Since the number of information sources 123 is likely to be very large and the cost of accessing them will be significant, it is important that the site description language permit knowledge representation system 109 to find a minimal set of relevant sites (or portions of sites).

In our discussion we assume that the external sites contain extensions of relations, denoted by $R=R_1,\ldots,R_m$. (Recall that concepts are unary relations and therefore, a site can contain the instances of a concept.) Note that a site need not explicitly store a certain relation, but only be able to compute it effectively when queried for it. Formally, $SL_0$ is the language of Horn rules containing relation names from R, E and D, and constraints. The site relations R appear only in the antecedents of the rules. Intuitively, a set of rules in $SL_0$ enables us to compute extensions of the knowledge base relations in E and D, given the relations in R. Given a set of rules, we add the formulas required by the predicate completion of the predicates in E (but not R!). See K. Clark, "Negation as Failure" in: *Logic and Data Bases*, Plenum Press, ed. J. Minker and H. Gallaire, New York, 1978, pp. 293–322. Intuitively, this means that extensions of these relations can be computed only using the given rules. Note that if we want to model incomplete information about some of the relations in E, then we can remove the predicate completion axioms for those relations. In our example, we can describe the following two travel agents:

Agent0DB(src,dest,cost,date)→Quote(Agent0,United, src,dest,cost,date).

Agent1DB(al,dest,cost,date)→Quote(Agent1,al,NYC, dest,cost,date).

Agent1DB(al,dest,cost,date)→(cost≦$1000).

Agent0 is an agent that sells tickets only on United Airlines. Agent1 specializes in cheap deals out of New York City. Note that the third rule specifies a constraint on the information in Agent1DB, and is allowed in $SL_0$. We also have three sites containing directory information:

212Residential(name,telNo)→Dir(name,212,telNo).

212Residential(name,telNo)→Residential(name).

212Business(name,telNo)→Dir(name,212,telNo).

212Business(name,telNo)→Business(name).

800Dir(name,telNo)→Dir(name,800,telNo).

The site 212Residential (212Business) contains the residential (business) customers in the 212 area code. The site 800Dir contains all the toll-free numbers.

Answering a specific query first requires that knowledge base system 109 determine which sources 123 contain information that can be used to answer the query. Having found the set of relevant sources 123, the next problem is to devise an optimal information access description. After access plan generation and execution component 119 has generated an access plan from the access description and executed the access plan to retrieve the information, knowledge representation system 109 uses the information to compute extensions to knowledge base relations and then uses the knowledge base as extended to compute the answer to the query. The challenge in this procedure is to determine the minimal portions of the site relations that are relevant to answering the query. Clearly, for some site relations the minimal portion can be empty, indicating that the site relation does not contain any relevant information.

In our example, since we are looking for a flight on AirFrance, Agent0 will be deemed irrelevant, and therefore, Agent0DB will be ignored. Similarly, the 800 directory listing database will not be queried. Moreover, since the first argument of Quote must be an instance of the concept TravelAgent, and since TravelAgent is subsumed by Business, which is disjoint from Residential, only the 212 business directory listing Will be considered for the query.

It should be realized that the problem of finding relevant sites is a crucial problem for system 101. Economical solutions to the problem are important not only for answering queries, but also for other operations. Examples include Processing updates on the knowledge base requires updating relevant site relations and hence, determining the relevant sites.

Efficiently monitoring queries over time requires determining precisely which external site relations should be monitored.

Maintaining consistency among site relations again requires that we determine which sites contain information relevant to a given consistency condition.

Finding the relevant sites is done by extending the algorithm described in Alon Y. Levy and Yehoshua Sagiv, "Constraints and Redundacy in Datalog", Proceedings of the Eleventh ACM SIGACT-SIGMOD-SIGART Symposium on Principles of Database Systems, San Diego, Calif., 1992. The key observation that enables us to use that algorithm is that the language for expressing constraints (concept descriptions and order constraints) satisfies the requirements of the query-tree algorithm outlined in that paper. Finding minimal portions of the sites is done in two steps. The first step determines which portions of the knowledge base relations are needed to solve the query, and the second step determines which portions of the site relations are needed to compute the relevant portions of the knowledge base relations. The algorithm uses the query-tree, which is a tool that, given a query which is expressed in terms of certain relations will specify which portions of the mentioned relations are relevant to the query. The first step is done by building a query-tree for the user query, in terms of the knowledge base relations, and pushing the constraints from the query to the KB relations. The second step is done by building a query-tree for each relevant KB relation (which is defined in terms of the external sites), and pushing the constraints to the external site relations.

The Site Description Language $SL_1$

Although the site description language $SL_0$ is quite expressive, it has some limitations. In practice, information may reside redundantly in many sources 123. Therefore, an important challenge is to find a set of site portions such that each portion is minimal and such that the overall set does not contain redundancies.

A major limitation of $SL_0$ is that we cannot express knowledge about the sites that enables finding such a non-redundant set. For instance, suppose that in our example, the query was to find some flight from NYC to Paris on United Airlines. There is no way in $SL_0$ to express the fact that Agent0 contains all the information about flights on United. Had we been able to express this knowledge, we could have determined that Agent0 by itself would suffice for answering this query, and hence, that knowledge of Agent1 would have been redundant.

The reason we cannot express this knowledge is that in $SL_0$, the site relations cannot appear in the consequents of the rules. In the extended language $SL_1$ which we describe below, we add additional rules which are weaker than the predicate completion axioms, and enable us to compute the knowledge base relations from the site relations. The language $SL_1$ contains the formulas in $SL_0$ and restricted forms of Horn rules in which the site relations appear in the consequents. Formally, except for rules in $SL_0$, knowledge about the relation R is specified by a set of rules of the form:

$$P_1(\bar{x}) \wedge C_1 \rightarrow R(\bar{x}).$$

$$P_k(\bar{x}) \wedge C_k \rightarrow R(\bar{x}).$$

where $P_i$ is a relation in E or D, and $C_i$ is a constraint. Furthermore, (for reasons we explain below) we restrict the rules such that the constraints are pairwise mutually exclusive, i.e., for each pair, $1 \leq i < j \leq k$, it must be the case that $C_i \wedge C_j$ is unsatisfiable. These rules specify that R contains complete information about the facts of $P_i$ that satisfy $C_i$. Given the rules above, we add the following rules that enable us to use R to compute the extensions of the knowledge base relations:

$$R(\bar{x}) \wedge C_1 \to P_1(\bar{x}).$$

$$R(\bar{x}) \wedge C_k \to P_k(\bar{x}).$$

Intuitively, this means that if we stated that R contains all the facts of $P_i$ that satisfy $C_i$, we take that also to mean that any fact in R that satisfies $C_i$ indeed belongs to $P_i$. Since the $C_i$'s are pairwise mutually exclusive, we obtain intuitive results. Note that if the constraints were not pairwise exclusive, as in rules $r_2$ and $r_3$, we would infer that some facts are in the intersection of the knowledge base relations.

The language $SL_1$ has several important properties. First, it enables us to express knowledge stating that a certain site contains complete information of a certain type. Second, given arbitrary formulas in $SL_1$ and a set of site relations, it is possible to uniquely determine the extensions of the knowledge base relations. Finally, given query, we show that an agent can find a non-redundant site set for computing the answer to the query. That is, the agent can find a set of minimal portions of sites such a that there are no redundancies among these portions. This notion is made formal as follows:

A site set is a set $\{(R_1, C_1), \ldots, (R_n, C_n)\}$, denoting the set of facts of the site relations $R_i$ satisfying the constraints $C_i$.

In our example, if we have a server with the listing of all travel agents in the greater NYC area (area codes 212 and 718), we can specify its contents as follows:

Dir(name,ac,telNo)∧((ac=212)∨(ac=718))∧TravelAgent(name)→ NYTravel(name,ac,telNo).

Given our query that restricts travel agents to the 212 area code, we can use this knowledge to determine that only the NYTravel directory listing is needed.

Allowing Specialized Sites

In the $SL_1$ rules we described above, the site relations contain the same attributes of the knowledge base relations. Often, a site relation will be specialized w.r.t. a knowledge base relation and therefore will contain fewer attributes. For example, Agent0DB does not contain the name of the agent as an attribute, nor the name of the airline. To express completeness knowledge about such sites, we allow for rules of the following form with a few restrictions:

$$E(\bar{x},\bar{y}) \wedge C \to R(\bar{x}).$$

In this rule, the site relation R projects out the arguments $\bar{y}$ of E. We impose restrictions on the rule that guarantee that the variables $\bar{y}$ can be determined uniquely, given $\bar{x}$. One such restriction is to require that all elements of $\bar{y}$ be constants. Another is to allow the rule to specify linear functions of $\bar{x}$ that uniquely determine $\bar{y}$. Adding the restricted completion axioms can be done as before.

As an example of using such rules, we can specify that Agent0 has all the flights of United Airlines:

Quote(Agent0,United,src,dest,cost,date)→Agent0DB(src,dest,cost, date).

The importance of using a site description language in information source descriptions 113 can be seen by a comparison of system 101 with the SIMS system. Both systems must first find the relevant sites and then access them. In SIMS, both of these tasks are approached as planning problems. In system 101, at least the first task can be done by the more economical techniques of logical inference. Moreover, SIMS does not allow arbitrary n-ary relations, and therefore, the system must map each external relation to a concept in LOOM. This can be done only when the relation has a primary key (i.e., an attribute that uniquely determines the rest of the attributes of the tuple). Although one can always conceptually add another such attribute to a relation, modeling a relation in such a way is unnatural.

Conclusion

The foregoing Detailed Description has disclosed to those of skill in the art how to make and use an information retrieval system which permits conceptual queries of heterogeneous information sources which are connected by means of a communications network. Important aspects of the system disclosed herein include the incorporation of a system/network view in the knowledge base and the use of a more expressive site description language in the information source descriptions component of the knowledge base. These aspects of the system permit the system to be used to access any source of information which satisfies two properties:

the source is connected to a communications network to which the system has access; and the source has a protocol for obtaining information which is known to the system.

Put another way, there is no requirement that a source have any kind of special adapter in order to be accessed by the system of the invention. The foregoing aspects of the system further permit the use of inference techniques instead of the more expensive planning techniques to determine which sources are to be accessed.

As is apparent from the Detailed Description, while the system of the invention is advantageously implemented using the CLASSIC knowledge base system, the principles of the invention are by no means restricted to that system, but may be implemented in other knowledge base systems as well. Further, other site description languages may be developed which incorporate the principles of the site description languages disclosed herein.

All of the above being the case, the foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws.

What is claimed is:

1. Information retrieval apparatus for retrieving information from a plurality of information sources, each information source being accessible by at least one of a plurality of information access protocols, the apparatus comprising:

a knowledge base responsive to a conceptual query on a knowledge representation of a domain of information, the knowledge representation including at least a world view including a first set of concepts employed in the conceptual query and a system view including a second set of concepts employed in accessing the plurality of information sources, the knowledge base responding to the query by using the world view and the system view to produce an information access description describing how to access information required for the query in the plurality of information sources; and means responsive to the information access description for employing the protocols to obtain information required to respond to the query from at least one information source in the plurality thereof and providing the obtained information to the knowledge base.

2. The apparatus set forth in claim 1 wherein:

the knowledge base further includes information source descriptions including a third set of concepts which describe the information sources; and the knowledge base further responds to the query by additionally using the information source descriptions to produce the information access description.

3. The apparatus set forth in claim 2 wherein:

the information source descriptions describe the information sources in terms of concepts from the first set thereof and the second set thereof.

4. The apparatus set forth in claim 3 wherein:

the information source descriptions further include descriptions of n-ary relations.

5. The apparatus set forth in claim 4 wherein:

the information source descriptions further include a constraint.

6. The apparatus set forth in claim 3 wherein:

the information source descriptions further include a constraint.

7. The apparatus set forth in claim 6 wherein:

the constraint is a subsumption constraint, wherein a variable is constrained to be subsumed in a concept.

8. The apparatus set forth in claim 7 wherein:

there is a plurality of the constraints and the plurality of constraints includes an order constraint.

9. The apparatus set forth in claim 8 wherein:

the knowledge base uses the information descriptions to produce the information access description such that the information access description describes a minimal relevant set of the information sources required for the query.

10. The apparatus set forth in claim 8 wherein:

the constraints are pairwise mutually exclusive; and the knowledge base uses the information descriptions to produce the information access description such that the information access description describes a minimal relevant set of the information sources required for the query which includes no redundancy.

11. The apparatus set forth in claim 2 wherein:

the means responsive to the information access description includes means responsive to the obtained information and to concepts in the knowledge base for replanning how further information is to be obtained.

12. The apparatus set forth in claim 2 further comprising:

a graphical user interface for representing the world view concepts as a directed graph.

13. The apparatus set forth in claim 12 wherein:

the graphical user interface includes interactive means for altering the world view by editing the directed graph.

14. Information retrieval apparatus for retrieving information from a plurality of information sources, each information source being accessible by at least one of a plurality of information access protocols, the apparatus comprising a knowledge base responsive to a conceptual query on a knowledge representation of a domain of information, the knowledge representation including at least a world view including a first set of concepts employed in the conceptual query and information source descriptions including a second set of concepts which describe the information sources in terms of concepts belonging to the world view, the knowledge base responding to the query by using the world view and the information source descriptions to produce an information access description describing how to access information required for the query in the plurality of information sources; and means responsive to the information access description for employing the protocols to obtain information required to respond to the query from at least one information source in the plurality thereof and providing the obtained information to the knowledge base, the apparatus having the improvement comprising:

descriptions of relations in the information source descriptions.

15. The apparatus set forth in claim 14 wherein:

the information source descriptions further includes a constraint.

16. The apparatus set forth in claim 15 wherein:

the constraint is a subsumption constraint, wherein a variable is constrained to be subsumed in a concept.

17. The apparatus set forth in claim 16 wherein:

there is a plurality of the constraints and the plurality of constraints includes an order constraint.

18. The apparatus set forth in claim 17 wherein:

the knowledge base uses the information descriptions to produce the information access description such that the information access description describes a minimal relevant set of the information sources required for the query.

19. The apparatus set forth in claim 17 wherein:

the constraints are pairwise mutually exclusive; and the knowledge base uses the information descriptions to produce the information access description such that the information access description describes a minimal relevant set of the information sources required for the query, the minimal relevant set including no redundancy.

* * * * *